(12) United States Patent
Ramasamy et al.

(10) Patent No.: US 11,657,270 B2
(45) Date of Patent: May 23, 2023

(54) SELF-ASSESSING DEEP REPRESENTATIONAL UNITS

(71) Applicant: Agency for Science, Technology and Research, Singapore (SG)

(72) Inventors: Savitha Ramasamy, Singapore (SG); Rajaraman Kanagasabai, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 435 days.

(21) Appl. No.: 16/651,637

(22) PCT Filed: Sep. 28, 2017

(86) PCT No.: PCT/SG2017/050486
§ 371 (c)(1),
(2) Date: Mar. 27, 2020

(87) PCT Pub. No.: WO2019/066718
PCT Pub. Date: Apr. 4, 2019

(65) Prior Publication Data
US 2020/0311544 A1    Oct. 1, 2020

(51) Int. Cl.
*G06N 3/08*      (2023.01)
*G06N 3/04*      (2023.01)

(52) U.S. Cl.
CPC ............... *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS 6,941,288 B2    9/2005    Lee et al.
8,682,065 B2    3/2014    Wang et al.
(Continued)

FOREIGN PATENT DOCUMENTS

CN    104361363 A    2/2015
CN    105184229 A    12/2015
(Continued)

OTHER PUBLICATIONS

Zhou et al., Online Incremental Featire Learning with Denoise Autoencodes, 2012, (AISTATS), whole document (Year: 2012).*
(Continued)

*Primary Examiner* — Sonia L Gay
(74) *Attorney, Agent, or Firm* — Shackelford, Bowen, McKinley & Norton, LLP

(57) ABSTRACT

A method, a computer-readable medium, and an apparatus for feature learning are provided. The apparatus may receive a data sample as an input to a feature learning model. The apparatus may calculate a reconstruction error based on the data sample and a plurality of features of the feature learning model. The apparatus may determine whether the reconstruction error satisfies a first threshold. The apparatus may add a feature into the feature learning model to represent the data sample if the data sample satisfies the first threshold. The apparatus may determine whether the reconstruction error satisfies a second threshold. The apparatus may ignore the data sample if the reconstruction error satisfies the second threshold. The apparatus may update the weights associated with the plurality of features of the feature learning model if the reconstruction error satisfies neither the first threshold nor the second threshold.

13 Claims, 6 Drawing Sheets

(56) References Cited

U.S. PATENT DOCUMENTS

| | | |
|---|---|---|
| 9,324,022 B2 | 4/2016 | Williams, Jr. et al. |
| 2011/0228982 A1 | 9/2011 | Zhou et al. |
| 2013/0110756 A1 | 5/2013 | Zhang et al. |
| 2016/0096270 A1 | 4/2016 | Ibarz Gabardos et al. |
| 2016/0155049 A1* | 6/2016 | Choi ..................... G06N 3/084 706/16 |
| 2017/0039471 A1 | 2/2017 | Ogawa |
| 2017/0177993 A1* | 6/2017 | Draelos ............... G06N 3/0454 |
| 2019/0378002 A1* | 12/2019 | Yajima .................... G06N 3/08 |

FOREIGN PATENT DOCUMENTS

| | | |
|---|---|---|
| CN | 106503461 A | 3/2017 |
| CN | 106919980 A | 7/2017 |
| CN | 106934458 A | 7/2017 |
| EP | 1197914 A1 | 4/2002 |
| EP | 3223183 A1 | 9/2017 |

OTHER PUBLICATIONS

Szerlip et al., "Unsupervised Feature Learning Through Divergent Discriminative Feature Accumulation," arXiv:1406.1833v2, Jun. 10, 2014, pp. 1-9.

International Search Report for International Application No. PCT/SG2017/050486 dated Dec. 11, 2017, pp. 1-4.

Written Opinion of the International Searching Authority for International Application No. PCT/SG2017/050486 dated Dec. 11, 2017, pp. 1-5.

* cited by examiner

SELF-ASSESSING DEEP REPRESENTATIONAL UNITS

TECHNICAL FIELD

Various aspects of this disclosure generally relate to machine learning, and more particularly, to feature learning.

BACKGROUND

Machine learning is a subfield of computer science that explores the study and development of algorithms that can learn from and make predictions on data. Such algorithms are aimed at building a model through learning from historic data inputs and make predictions or decisions on new data based on the model. Machine learning is employed in a range of computing tasks where deriving rules and insights from the past experiences, and/or continuous human inspection is infeasible. Within the field of data analytics, machine learning is a method used to devise complex models and algorithms that lend themselves to prediction. These analytical models allow researchers, data scientists, engineers, and analysts to produce reliable, repeatable decisions and results and uncover hidden insights through learning from historical relationships and trends in the data.

Feature engineering is the process of generating hand crafted domain specific features from raw data to solve complex machine learning problems. Feature learning or representation learning is a set of techniques that allows a system to automatically discover the representations needed for feature detection or classification from raw data. Feature learning replaces manual feature engineering and allows a machine to both learn the features and use them to perform a specific task.

Feature learning methods such as principal component analysis and deep learning techniques are capable of generating high level abstract features from raw data. In deep learning algorithms, feature learning is performed by modelling high level abstractions in data through multiple layers that perform linear and nonlinear transformations. Feature learning methods may be used to solve problems described by historic data, where the ground truth is either available or unavailable, i.e., they are applicable to both supervised and unsupervised settings. In both supervised and unsupervised settings, they are applied to generate higher level representations from raw data to gain insights from the data. The generated higher level representations are used to map to the ground truth in a supervised setting. In an unsupervised setting, these higher level abstract representations model the distribution of the inputs.

In either a supervised or unsupervised setting, deep learning techniques learn every sample of data being presented. These algorithms learn from the environment represented by the data, without understanding the dynamics of the data they represent. Thus, deep learning techniques do not assess themselves, and are hence, not able to make judicious choice about the data sample being presented. In addition to and owing to these, the architecture of these deep learning techniques is fixed a priori regardless of the dynamics of the data being learnt. Further, although deep learning techniques can learn from streaming data, they are incapable of recognizing non-stationary patterns in the data, and hence, cannot adapt themselves to changing input distribution.

However, industrial problems often involve streaming data where the dynamics of the data environment is not stationary. Further, the data may not be well distributed. While some regions are sparsely represented, some regions may have intense distribution. This biases the learning algorithm towards the region of intense distribution. Therefore, a feature learning technique that addresses the above mentioned industrial needs may be desirable.

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

In one aspect of the disclosure, a feature learning method or apparatus is provided. The feature learning apparatus may dynamically evolve as it generates higher level abstract representations from raw data. The feature learning apparatus may self-assess itself such that it evaluates its representations continuously with respect to the environment variables. The feature learning apparatus may be capable of learning from environments represented by streaming data.

In one aspect of the disclosure, a method, a computer-readable medium, and an apparatus for feature learning are provided. The apparatus may receive a data sample as an input to a feature learning model. The apparatus may calculate a reconstruction error based on the data sample and the higher level representations through a plurality of features of the feature learning model. The apparatus may determine whether the reconstruction error satisfies a first threshold. The apparatus may add a feature into the feature learning model to represent the data sample if the data sample satisfies the first threshold. The apparatus may update the weights associated with the plurality of features and the feature. The apparatus may determine whether the reconstruction error satisfies a second threshold. The apparatus may ignore the data sample if the reconstruction error satisfies the second threshold. The apparatus may update the weights associated with the plurality of features of the feature learning model if the reconstruction error satisfies neither the first threshold nor the second threshold.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

DETAILED DESCRIPTION

Figure 1:
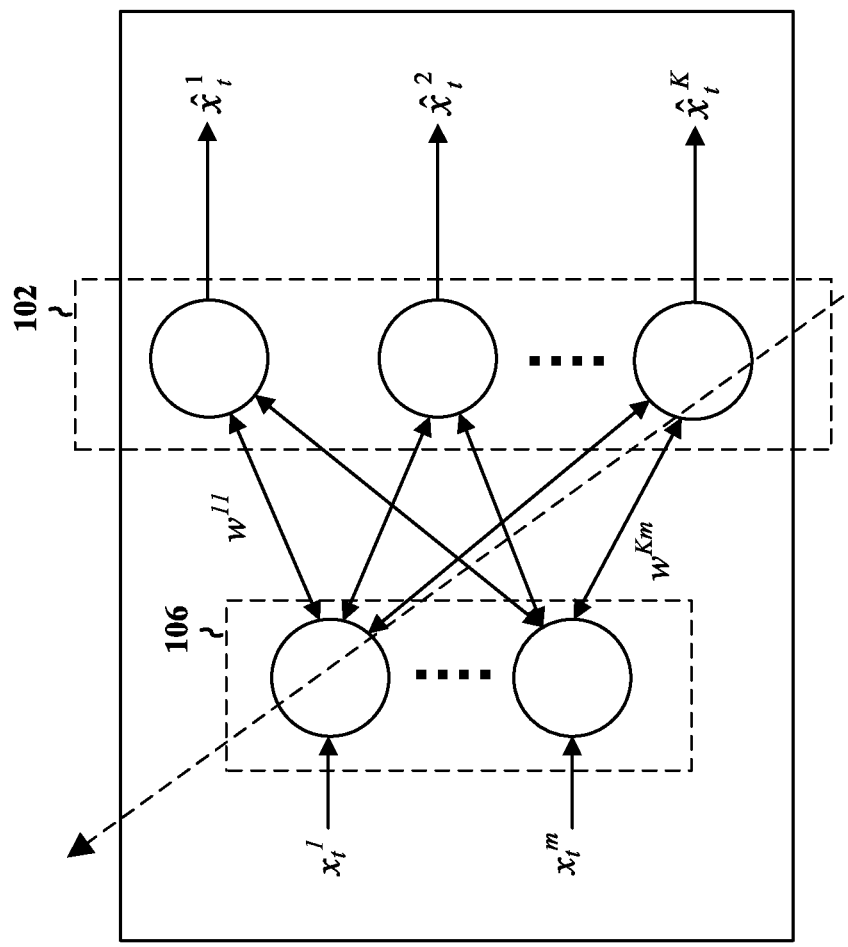
FIG. 1 is a diagram illustrating an example of refining representations of a neural network.

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a feature learning technique will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one or more embodiments, a feature learning technique may be applied to an artificial neural network. An artificial neural network may be defined by three types of parameters: 1) the interconnection pattern between the different layers of neurons; 2) the learning process for updating the weights of the interconnections; and 3) the activation function that converts a neuron's weighted input to its output activation. Neural networks may be designed with a variety of connectivity patterns. In feed-forward networks, information is passed from lower to higher layers, with each neuron in a given layer communicating with neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

FIG. 1 is a diagram illustrating an example of refining representations of a neural network 100. As illustrated, at an input layer 106, the neural network 100 may receive an m-dimensional data sample, $x_t=[x_t^1, \ldots, x_t^m]$. The neural network 100 may include a deep representational unit (DRU) 102. The DRU 102 may be a layer of a deep learning network that generates K features representing the raw features of the data. The feature representations learnt by the DRU 102 may be represented by:

$$\hat{x} = \{\hat{x}^1, \ldots, \hat{x}^K\}.$$

In one aspect of the disclosure, self-assessing deep representational units (SA-DRUs) are provided. The self-assessing deep representational units may enable dynamic architecture of the feature representation units through self-evaluation of their represented knowledge, while learning from an environment of streaming data. In the description below, the deep representational unit may be defined as the learner, and the data that is being learnt may be defined as the environment. When a learner assesses its own knowledge with respect to the environment it learns, it may build itself and evolve as it learns, addressing the demands of the environment. Therefore, in this disclosure, a self-assessing deep feature representational unit is provided. The self-assessing deep feature representational unit may continuously evaluate its knowledge representation with respect to the environment and evolve as it represents the distribution of the input raw data.

Figure 2:
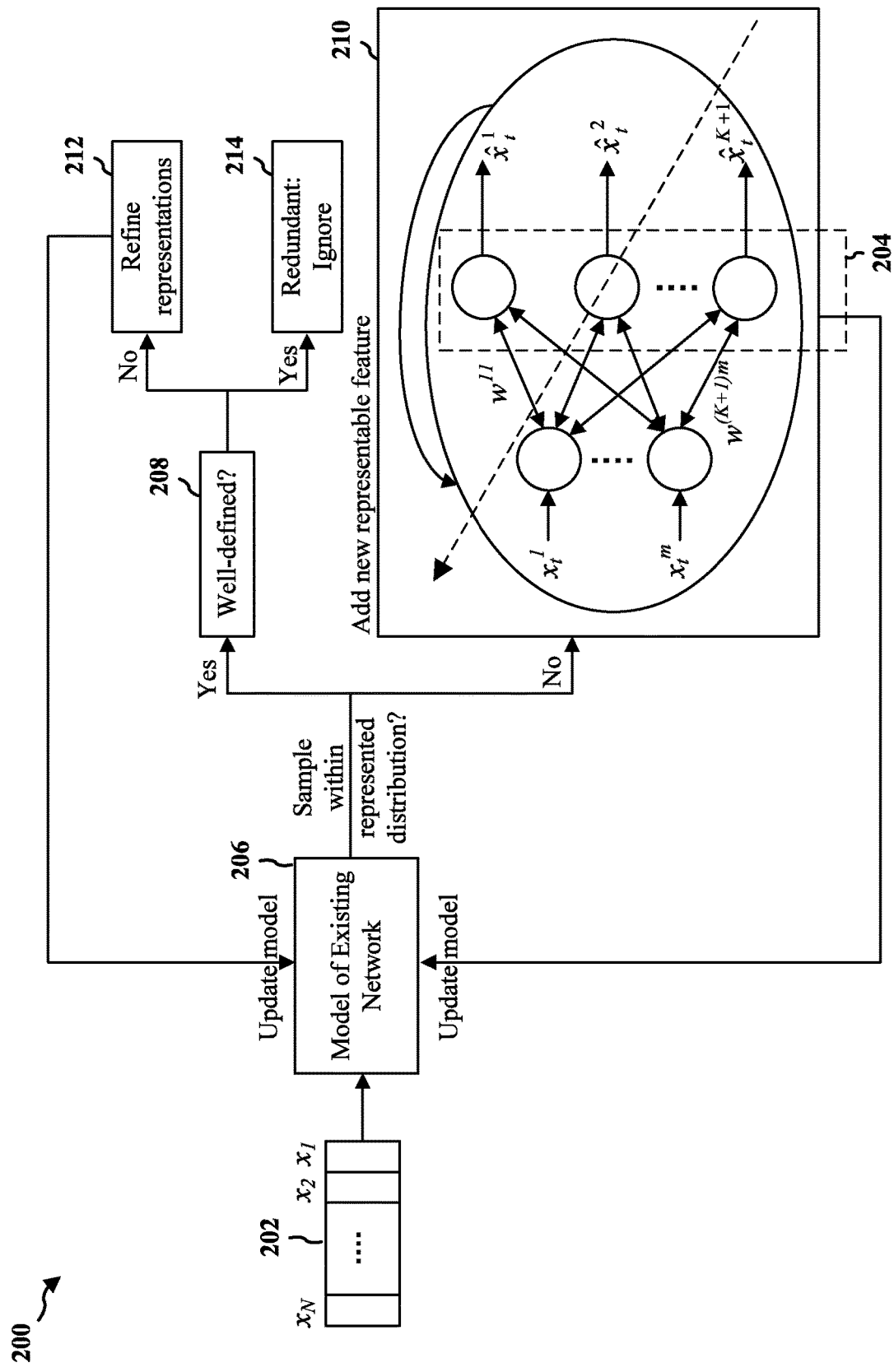
FIG. 2 illustrates an example of an overall working diagram of a self-assessing deep representational unit for online feature learning.

FIG. 2 illustrates an example of an overall working diagram 200 of a self-assessing deep representational unit for online feature learning. As illustrated, the SA-DRU may receive sample dataset 202 for online feature learning. The sample dataset 202 may be denoted by $\{x_1, \ldots, x_t, \ldots, x_N\}$, where N is the total number of samples, $x_t \in \text{Re}^m = [x_t^1, \ldots, x_t^m]$. The DRU 204 is defined as a layer of a deep learning network that generates features representing the raw features of the sample dataset 202. The self-assessing ability of the SA-DRU helps the DRU 204 to evolve, as it represents the raw features. Thus, beginning with zero represented features, the self-assessing deep representational unit evolves as it represents these raw features. Assuming that the SA-DRU generates K features to represent the data distribution from t−1 data samples, the feature representations learnt by the SA-DRU from the t−1 data samples may be given by:

$$\hat{x} = \{\hat{x}^1, \ldots, \hat{x}^K\}.$$

When the data sample $x_t$ is presented to the SA-DRU, the SA-DRU computes the representation for data sample $x_t$ based on its knowledge from the previous t−1 samples, e.g., based on the model 206 of existing network.

The reconstruction of an input is a mapping from the outputs (in response to the input) to the inputs based on the learnt model. A reconstruction error is a measure of the difference between the input and the reconstruction of the input. In one embodiment, the SA-DRU may evaluate its knowledge representation ability for the data sample $x_t$ using the reconstruction error. In one embodiment, the reconstruction error $e_x^t$ regarding data sample $x_t$ may be given by:

$$e_x^t = \sqrt{(x_t - \widehat{x_t})^T (x_t - \widehat{x_t})} \quad (1)$$

where $\widehat{x_t}$ represents the reconstruction of the data sample $x_t$.

In one embodiment, the reconstruction error $e_x^t$ for data sample $x_t$ is given by:

$$e_x^t = \cos(x_t, \widehat{x_t}) \quad (2)$$

In one embodiment, the reconstruction error $e_x^t$ for data sample $x_t$ is given by:

$$e_x^t = \mathcal{N}(x_t, \widehat{x_t}) \quad (3)$$

where $\mathcal{N}$ is a Gaussian function.

Thus, the reconstruction error is any function that measures the deviation of the distribution $\widehat{x_t}$ from the actual input $x_t$, and hence the novelty of the input $x_t$. Based on the knowledge representation ability, the SA-DRU may determine whether the data sample $x_t$ is within the represented distribution of the existing DRU. If the data sample $x_t$ is within the represented distribution of the existing DRU, the SA-DRU may determine (at 208) whether the data sample $x_t$ is well-defined by the represented distribution. If the data sample $x_t$ is well-defined by the represented distribution, the SA-DRU may (at 214) consider the data sample $x_t$ as redundant and may not initiate any action on this data sample. If the data sample $x_t$ is not well-defined by the represented distribution, the SA-DRU may (at 212) use this data sample to refine its sample distribution representations, using the feature learning algorithm employed by the DRU. In one embodiment, the sample distribution representations of the SA-DRU may be refined in the way as described above with reference to FIG. 1. In one embodiment, if the DRU is a Restricted Boltzmann Machine, the probability distribution of the represented features may be refined based on the data sample $x_t$.

If the data sample $x_t$ is not within the represented distribution of the existing DRU, the SA-DRU may generate (at 210) a new representable feature K+1 in the DRU 204 and refines its distribution of all the represented features using the feature learning algorithm employed by the DRU 204. In one embodiment, the weights may be refined similarly with the operations described above in FIG. 1.

In one embodiment, if the probability distribution represented by the feature learning model 206 already covers the data sample $x_t$, the SA-DRU may ignore the data sample. This strategy may be defined by: if $e_x^t < E_{learn}$, the data sample $x_t$ is well defined by existing distribution, and the SA-DRU may ignore the data sample. Here $E_{learn}$ is the sample learning threshold that is a numerical value or a function.

If the data sample $x_t$ is novel, and the feature represented by the feature learning model does not include the data sample, the SA-DRU may generate a feature. Also, the SA-DRU may update the weights of all the generated features in order to include the representation of the new sample. This helps to refine the distributions represented by all the generated features to include the data sample $x_t$. This strategy may be defined by: if $e_x^t > E_{add}$, the SA-DRU may generate a new feature and update the weights of all the generated features. Here $E_{add}$ is the feature generation threshold that is a numerical value or a function. $E_{add}$ self-adapts itself as feature representation progresses, according to $E_{add} = f(\alpha E_{add} - \beta_x^t)$, where $\alpha$ and $\beta$ are tunable parameters. The value and/or function of $E_{add}$ and $E_{learn}$ are designed such that $E_{add} > E_{learn}$.

If the data sample $x_t$ can neither be ignored, nor is it novel to add a representation, the SA-DRU may use the data sample to refine the representations to include the knowledge imbibed in the data sample. This strategy may be defined by: if $e_x^t > E_{learn}$ and $e_x^t < E_{add}$, the SA-DRU may update the weights of the existing feature representational model. In one embodiment, the $E_{learn}$ threshold is then self-adapted according to $E_{learn} = f(\alpha E_{learn} - \beta e_x^t)$.

Figure 3:
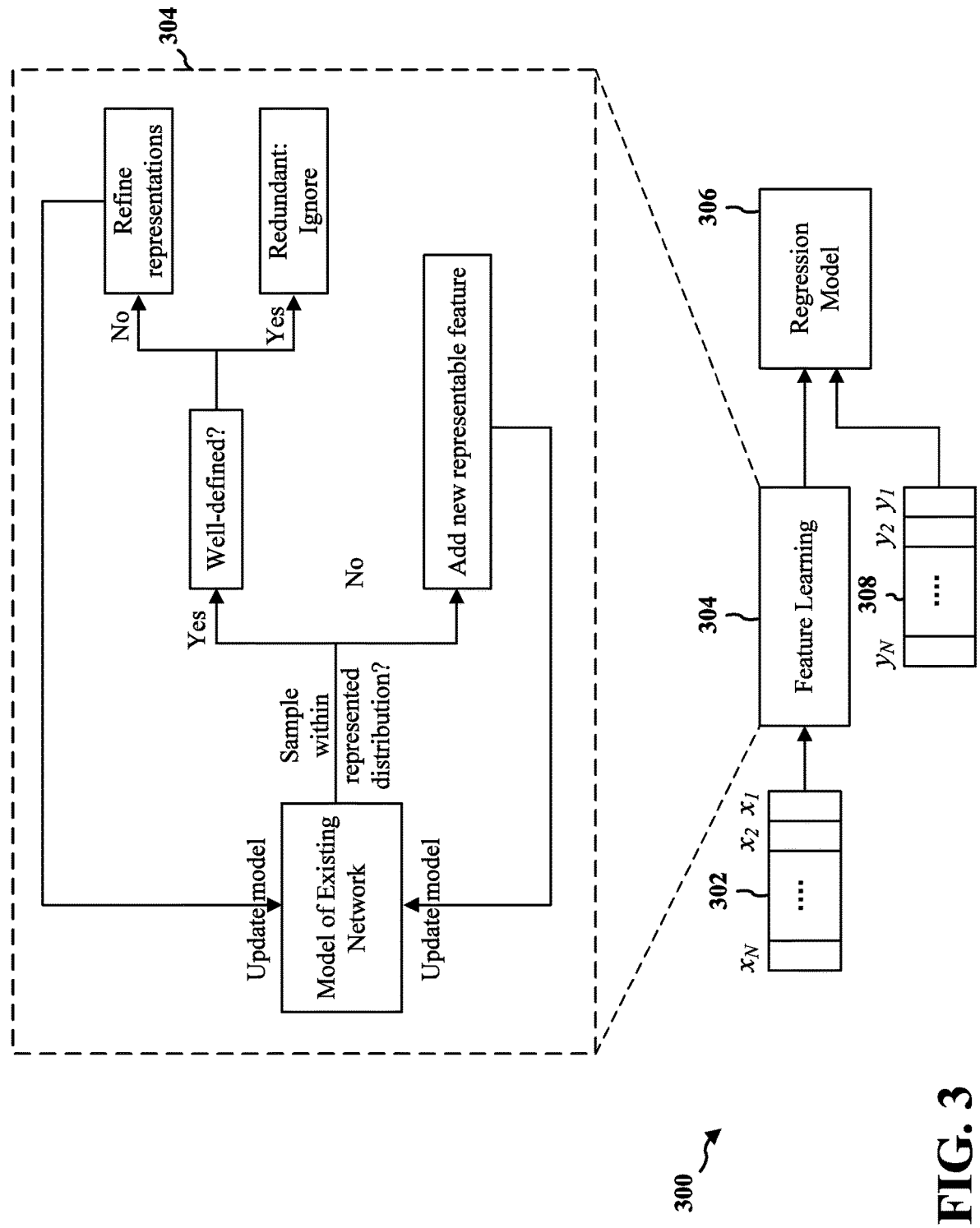
FIG. 3 is a diagram illustrating an example of applying the self-assessing deep representational unit for online feature learning.

FIG. 3 is a diagram 300 illustrating an example of applying the self-assessing deep representational unit for online feature learning. In the example, a sample dataset 302 may be presented for online feature learning at 304. The sample dataset 302 may be denoted by $\{x_1, \ldots, x_t, x_N\}$, where N is the total number of samples. In one embodiment, operations performed at 304 for online feature learning may be the operations described above with reference to FIG. 2. A regression model 306 may be generated through the feature learning at 304. The regression model 306 may be presented with a testing dataset 308 to make estimation based on the learnt model.

Industrial data is often analysed using supervised machine learning methods such as classification and regression and unsupervised machine learning techniques such as clustering etc. In one embodiment, the self-assessing deep representational unit described above with reference to FIGS. 1-3 may be applied to fraud analytics. Fraud analytics is solved as a classification problem. The problem is defined as identifying fraudulent cases from a huge number of applications. In general, it involves predicting the occurrence of fraudulent cases in advance. It may also include identifying or detecting faulty products or predicting the chances of a faulty produce in a machine floor.

In one embodiment, the self-assessing deep representational unit described above with reference to FIGS. 1-3 may be applied to text classification. Text classification is a problem of classifying documents into several predefined categories, where each document may belong to more than one category. For example, given a bunch of documents, text classification may involve classifying the field of the documents—library science, computer science, information science, etc.

In one embodiment, the self-assessing deep representational unit described above with reference to FIGS. 1-3 may be applied to machine health analytics. Machine health analytics includes diagnostics and prognostics of machine health condition. Machine health diagnostics is the art of predicting the cause of failure after a machine fails. On the other hand, prognostics is the art of predicting the chances of failure of a machine under healthy working condition. In addition to these methods, anomaly detection is an important problem to identify faults, which is usually solved using clustering techniques.

In one embodiment, the self-assessing deep representational unit described above with reference to FIGS. 1-3 may be applied to remaining useful life (RUL) prediction. RUL prediction is a regression problem where the help of machine learning techniques is sought to predict the number of cycles a critical component in machinery can withstand further, based on its current working condition.

In one embodiment, the self-assessing deep representational unit described above with reference to FIGS. 1-3 may be applied to environment modelling/monitoring. Environment modelling is a regression task where the future environmental conditions in an area of interest are predicted, based on the current environmental conditions.

In addition to these problems, supervised machine learning methods are used to solve a wide variety of problems for several industrial settings, from a wide range of sensor and non-sensor data. Conventional machine learning algorithms require feature engineering on raw data to solve classification and regression tasks efficiently. With the self-assessing deep representational unit described above, automatic feature learning may be used instead.

In one embodiment, a Self-Assessing Restricted Boltzmann Machine (SA-RBM) that generates features representing the input distribution as it learns from batch of data is provided. The SA-RBM may use the technique described above with reference to FIGS. 1-3. The SA-RBM may be applied to solve credit analytics problems using publicly available data sets, viz., Australian credit data set, German credit data set, and the Kaggle 'Give me some credit' data set. The details of this datasets are shown in Table 1 below:

TABLE 1

Details of the data set used in evaluation

| Problem | No. of features | No. of classes | No. of samples | I.F. |
|---|---|---|---|---|
| German Credit | 24 | 2 | 1000 | 0.4 |
| Australian Credit | 14 | 2 | 690 | 0.1101 |
| KAGGLE Credit | 10 | 2 | 150000 | 0.86632 |

Here I.F is the Imbalance Factor that gives a measure of the ratio of number of positive examples to number of negative examples.

In different problems, the performance of SA-RBM is compared against Support Vector Machines (SVM), Extreme Learning Machines (ELM), Multi-Layer Perceptron Neural Network (NN), and Restricted Boltzmann Machines (RBM). The results are tabulated in Tables 2, 3, and 4.

TABLE 2

Test Case 1: Performance Evaluation of the German credit data set

| Classifier | Neuron number | Training Overall | Average | Testing Overall | Average | TNR | TPR | Gmean |
|---|---|---|---|---|---|---|---|---|
| SVM | 534 | 93 | 89.655 | 72.6667 | 53.765 | 0.8878 | 0.3255 | 0.5376 |
| ELM | 60 | 78.429 | 69.95 | 73.33 | 66.355 | 0.8271 | 0.5 | 0.6431 |
| NN | 80 | 98.571 | 97.573 | 72.333 | 65.105 | 0.8446 | 0.4574 | 0.6216 |
| RBM | 80 | 97 | 95.7473 | 71.667 | 63.448 | 0.8271 | 0.4418 | 0.6045 |
| SA-RBM | 14 | 94.143 | 91.859 | 76 | 68.92 | 0.855 | 0.52326 | 0.66892 |

TABLE 3

Test case 2: Performance Evaluation on the Australian Credit data set

| Classifier | Neuron number | Training Overall | Average | Testing Overall | Average | TNR | TPR | Gmean |
|---|---|---|---|---|---|---|---|---|
| SVM | 192 | 85.507 | 86.263 | 85.507 | 86.048 | 0.9263 | 0.7946 | 0.8579 |
| ELM | 60 | 88.199 | 87.875 | 85.99 | 85.881 | 0.8738 | 0.8438 | 0.8587 |
| NN | 80 | 94.824 | 94.767 | 84.058 | 83.727 | 0.8828 | 0.7917 | 0.836 |
| RBM | 50 | 86.128 | 86.391 | 85.507 | 86.021 | 0.8264 | 0.8953 | 0.8602 |
| SA_RBM | 24 | 86.68 | 86.971 | 88.372 | 89.262 | 0.9436 | 0.84158 | 0.8912 |

TABLE 4

Test Case 3: Performance Evaluation on the KAGGLE Cup Data set

| Classifier | Neuron number | Training Overall | Average | Testing Overall | Average | TNR | TPR | Gmean |
|---|---|---|---|---|---|---|---|---|
| SVM | 6340 | 69.97 | 59.43 | 72.24 | 60.018 | 0.8982 | 0.5771 | 0.72 |
| ELM | 60 | 75.112 | 73.1438 | 87.667 | 73.7683 | 0.7593 | 0.501 | 0.6167 |
| NN | 100 | 63.8958 | 62.287 | 74.2 | 63.017 | 0.8792 | 0.6165 | 0.7363 |
| RBM | 100 | 75.6878 | 74.0483 | 86.16 | 74.7892 | 0.8975 | 0.6 | 0.73384 |
| SA_RBM | 21 | 77.016 | 76.269 | 81.709 | 76.537 | 0.8251 | 0.70531 | 0.76303 |

As shown in Table 2-4, SA-RBM generally uses less number of neurons than traditional algorithms, thus reducing computational cost. Also, SA-RBM generally achieves better performance (e.g., better geometric means of various measurements) than traditional algorithms.

In one aspect of the disclosure, a self-assessing feature representation unit is provided. The self-assessing feature representation unit may be able to learn features from streaming data and perform machine learning tasks. In one embodiment, the self-assessing feature representation unit may dynamically evolve architecture of the network. In one embodiment, the self-assessing feature representation unit may continuously evaluate itself with respect to the environment variables. In one embodiment, the self-assessing feature representation unit may aid online feature learning in a deep learning framework. In one embodiment, the self-assessing feature representation unit may only choose novel samples for learning. In one embodiment, the self-assessing feature representation unit may have concise architecture. In one embodiment, the self-assessing feature representation unit may have higher generalization ability.

Figure 4:
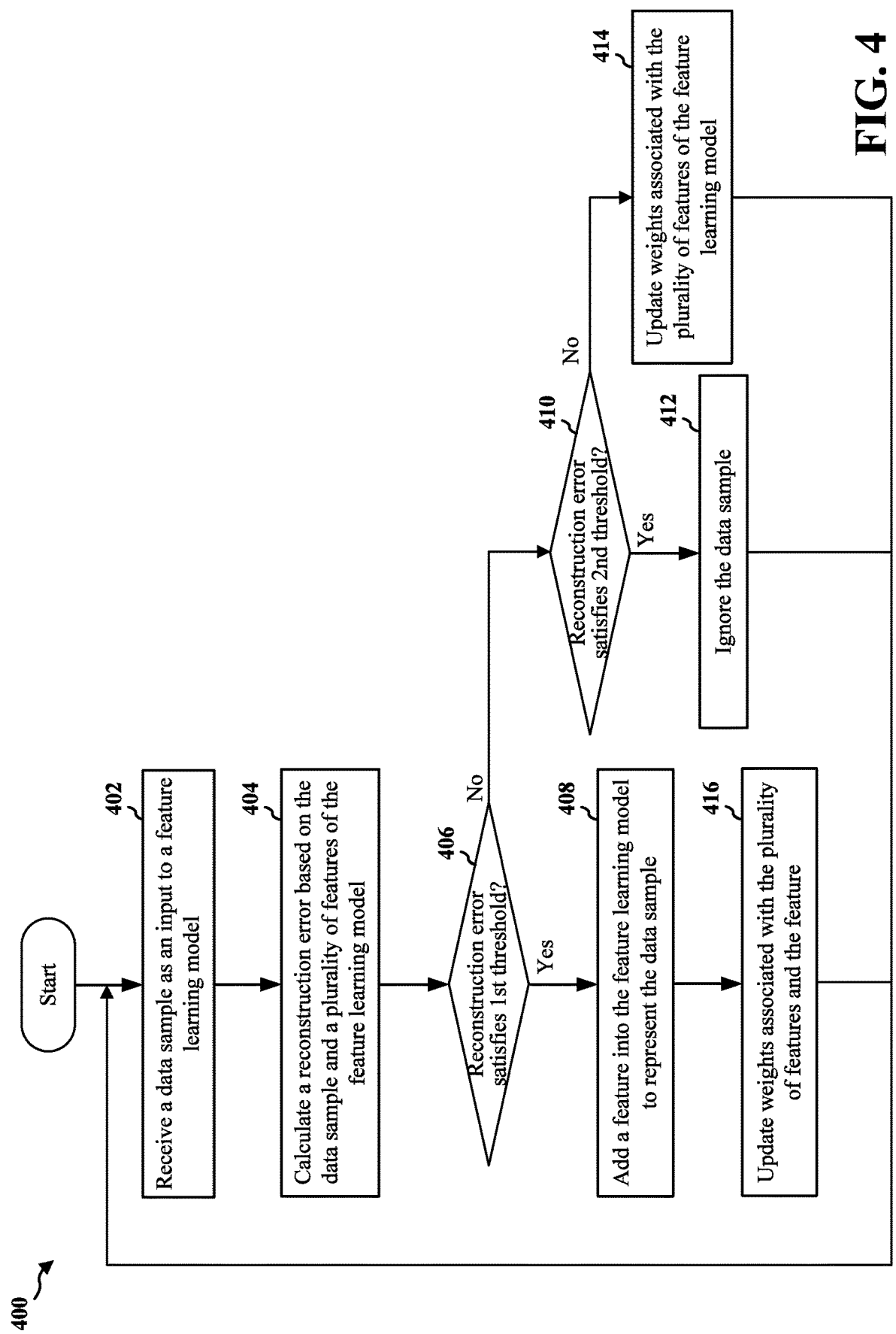
FIG. 4 is a flowchart of a method of feature learning.

FIG. 4 is a flowchart 400 of a method of feature learning. In one embodiment, the method may be performed by the SA-DRU described above with reference to FIGS. 1-3. In one embodiment, the method may be performed by a computing device or system (e.g., the apparatus 502/502' shown in FIG. 5/FIG. 6).

At 402, the method may receive a data sample as an input to a feature learning model. In one embodiment, the feature learning model may include a neural network and each feature of the feature learning model may include a neuron.

At 404, the method may calculate a reconstruction error based on the data sample and a plurality of features of the feature learning model. In one embodiment, the reconstruction error may be calculated based on differences between a value of the data sample and reconstruction values corresponding to the plurality of features. In one embodiment, the reconstruction error may be calculated based on equation (1) described above with reference to FIG. 2.

At 406, the method may determine whether the reconstruction error satisfies a first threshold. If the reconstruction error satisfies the first threshold, the method may proceed to 408. Otherwise, the method may proceed to 410. In one embodiment, the reconstruction error may satisfy the first threshold when the reconstruction error is greater than the first threshold. In one embodiment, the first threshold may be the feature generation threshold $E_{add}$ described above with reference to FIG. 2.

At 408, the method may add a feature into the feature learning model to represent the data sample. In one embodiment, the new feature may be added by performing the operations described above with reference to 210 in FIG. 2.

At 416, the method may update weights associated with the plurality of features and weights associated with the new feature in the feature learning model. The method may then loop back to 402. In one embodiment, the weights may be updated by performing the operations described above with reference to 210 in FIG. 2.

At 410, the method may determine whether the reconstruction error satisfies a second threshold. If the reconstruction error satisfies the second threshold, the method may proceed to 412. Otherwise, the method may proceed to 414. In one embodiment, the reconstruction error may satisfy the second threshold when the reconstruction error is less than the second threshold. In one embodiment, the second threshold may be the sample learning threshold $E_{learn}$ described above with reference to FIG. 2. In one embodiment, the reconstruction error may satisfy neither the first threshold nor the second threshold when the reconstruction error is between the first threshold and the second threshold, where the first threshold is greater than the second threshold.

At 412, the method may ignore the data sample. The method may then loop back to 402. In one embodiment, the data sample may be ignored by performing the operations described above with reference to 214 in FIG. 2.

At 414, the method may update weights associated with the plurality of features of the feature learning model. The method may then loop back to 402. In one embodiment, the weights may be updated by performing the operations described above with reference to 212 in FIG. 2.

Figure 5:
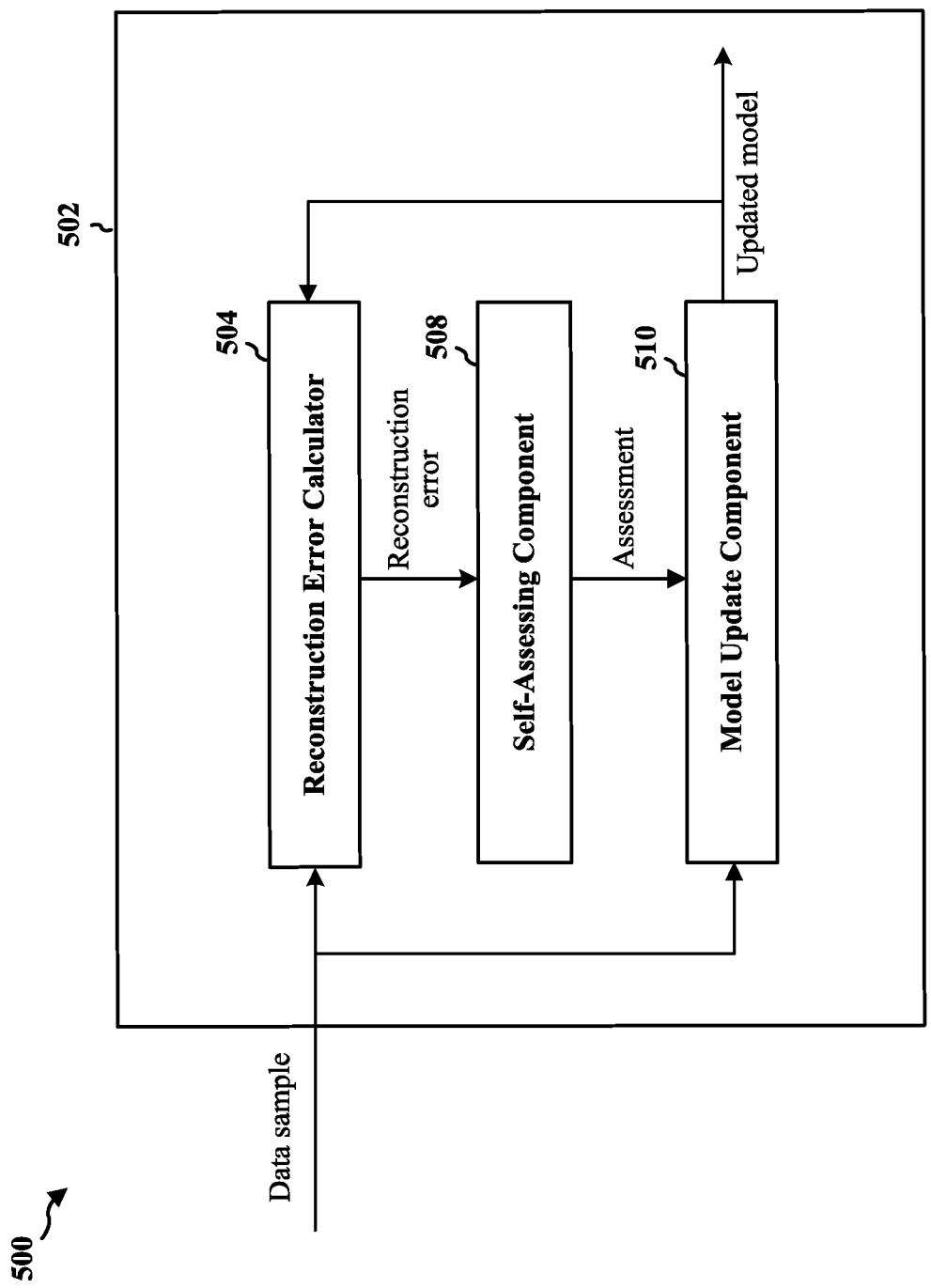
FIG. 5 is a conceptual data flow diagram illustrating the data flow between different means/components in an exemplary apparatus.

FIG. 5 is a conceptual data flow diagram 500 illustrating the data flow between different means/components in an exemplary apparatus 502. The apparatus 502 may be a computing device or a system including multiple computing devices. The apparatus 502 may implement the SA-DRU described above with reference to FIGS. 1-4.

The apparatus 502 may include a reconstruction error calculator 504 that calculates reconstruction error for a new data sample based on the current/updated feature learning model. In one embodiment, the reconstruction error calculator 504 may perform the operations described above with reference to 404 in FIG. 4.

The apparatus 502 may include a self-assessing component 508 that assesses the knowledge representation ability of the apparatus 502 for the new data sample based on the reconstruction error provided by the reconstruction error calculator 504. In one embodiment, the self-assessing component 508 may perform the operations described above with reference to 406 or 410 in FIG. 4.

The apparatus 502 may include a model update component 510 that updates the feature learning model based on the assessments provided by the self-assessing component 508. The update may be performed based on the new data sample. In one embodiment, the model update component 510 may perform the operations described above with reference to 408, 416, 412, or 414 in FIG. 4.

The apparatus 502 may include additional components that perform each of the blocks of the algorithm in the aforementioned flowchart of FIG. 4. As such, each block in the aforementioned flowchart of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
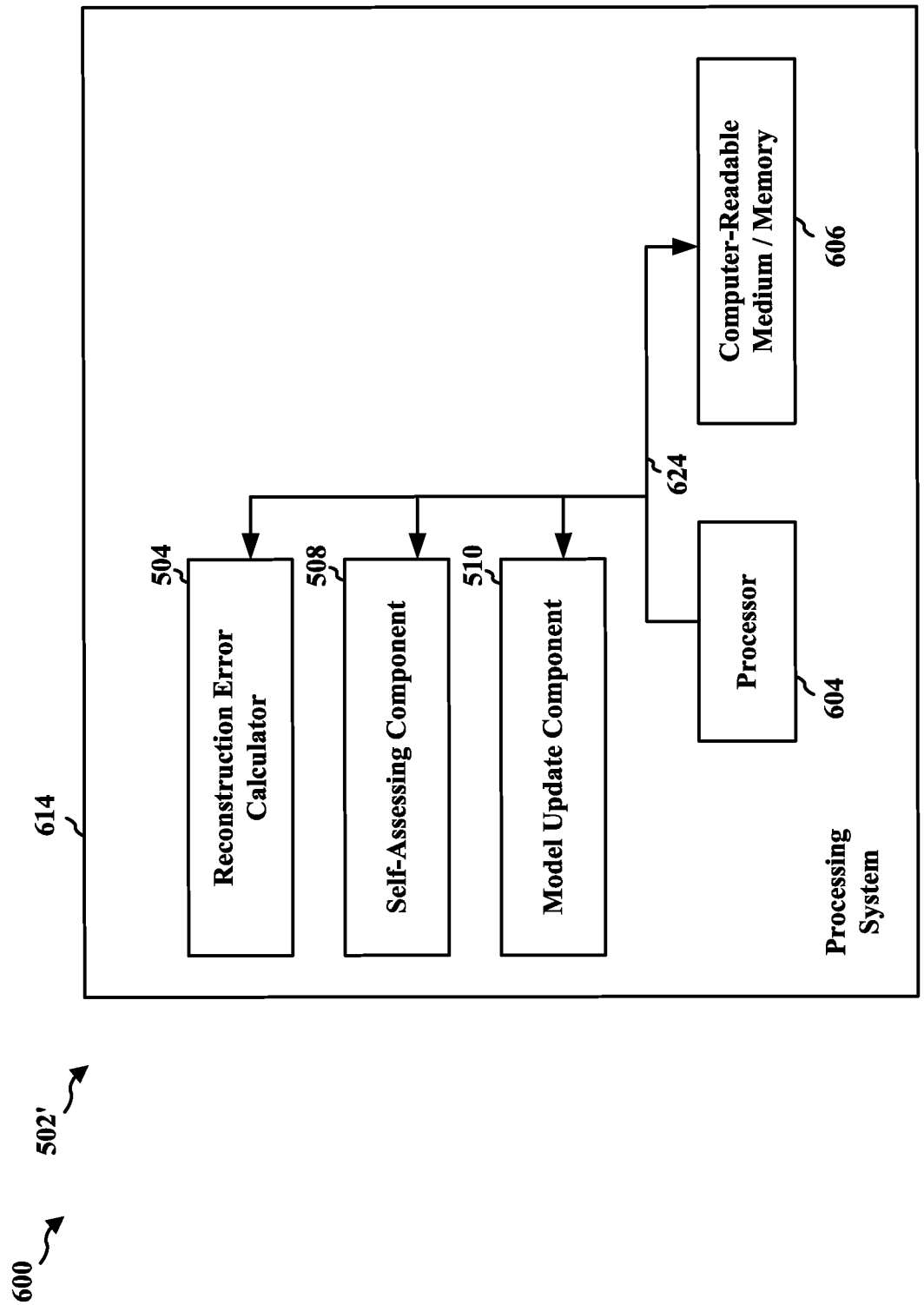
FIG. 6 is a diagram illustrating an example of a hardware implementation for an apparatus employing a processing system.

FIG. 6 is a diagram 600 illustrating an example of a hardware implementation for an apparatus 502' employing a processing system 614. The apparatus 502' may be the apparatus 502 described above with reference to FIG. 5. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 504, 508, 510, and the computer-readable medium/memory 606. The bus 624 may also link various other circuits such as timing sources, peripherals, voltage regulators, and power management circuits, which are well known in the art, and therefore, will not be described any further.

The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 508, 510. The components may be software components running in the processor 604, resident/stored in the computer readable medium/memory 606, one or more hardware components coupled to the processor 604, or some combination thereof.

In the following, various aspects of this disclosure will be illustrated:

Example 1 is a method or apparatus for feature learning. The method or apparatus may receive a data sample as an input to a feature learning model, calculate a reconstruction error based on the data sample and a plurality of features of the feature learning model, determine whether the reconstruction error satisfies a first threshold, and add a feature into the feature learning model to represent the data sample when the data sample satisfies the first threshold.

In Example 2, the subject matter of Example 1 may optionally include that the method or apparatus may further update, by using the data sample, weights associated with the plurality of features and the feature.

In Example 3, the subject matter of any one of Examples 1 to 2 may optionally include that the method or apparatus may further determine whether the reconstruction error satisfies a second threshold, and ignore the data sample when the reconstruction error satisfies the second threshold.

In Example 4, the subject matter of Example 3 may optionally include that the method or apparatus may further update, by using the data sample, weights associated with the plurality of features of the feature learning model when the reconstruction error satisfies neither the first threshold nor the second threshold.

In Example 5, the subject matter of any one of Examples 1 to 4 may optionally include that the reconstruction error satisfies the first threshold when the reconstruction error is greater than the first threshold.

In Example 6, the subject matter of any one of Examples 3 to 5 may optionally include that the reconstruction error satisfies the second threshold when the reconstruction error is less than the second threshold.

In Example 7, the subject matter of any one of Examples 3 to 6 may optionally include that the reconstruction error satisfies neither the first threshold nor the second threshold when the reconstruction error is between the first threshold and the second threshold, the first threshold being greater than the second threshold.

In Example 8, the subject matter of any one of Examples 1 to 7 may optionally include that the reconstruction error is calculated based on differences between a value of the data sample and reconstruction values corresponding to the plurality of features.

In Example 9, the subject matter of any one of Examples 1 to 8 may optionally include that the feature learning model comprises a neural network and each feature of the feature learning model comprises a neuron.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of feature learning carried out by a computing device, the method comprising:
receiving a data sample as an input to a feature learning model;
calculating a reconstruction error based on the data sample and a plurality of features of the feature learning model;
determining whether the reconstruction error satisfies a first threshold;

adding a feature into the feature learning model to represent the data sample and updating, by using the data sample, weights associated with the plurality of features and the feature when the data sample satisfies the first threshold;

determining whether the reconstruction error satisfies a second threshold;

ignoring the data sample when the reconstruction error satisfies the second threshold; and updating, by using the data sample, weights associated with the plurality of features of the feature learning model when the reconstruction error satisfies neither the first threshold nor the second threshold.

2. The method of claim 1, wherein the reconstruction error satisfies the first threshold when the reconstruction error is greater than the first threshold.

3. The method of claim 2, wherein the reconstruction error satisfies the second threshold when the reconstruction error is less than the second threshold.

4. The method of claim 3, wherein the reconstruction error satisfies neither the first threshold nor the second threshold when the reconstruction error is between the first threshold and the second threshold, the first threshold being greater than the second threshold.

5. The method of claim 1, wherein the reconstruction error is calculated based on differences between a value of the data sample and reconstruction values corresponding to the plurality of features.

6. The method of claim 1, wherein the feature learning model comprises a neural network and each feature of the feature learning model comprises a neuron.

7. An apparatus for feature learning, comprising:
a memory; and
at least one processor coupled to the memory and configured to:
receive a data sample as an input to a feature learning model;
calculate a reconstruction error based on the data sample and a plurality of features of the feature learning model;
determine whether the reconstruction error satisfies a first threshold;
add a feature into the feature learning model to represent the data sample and update, by using the data sample, weights associated with the plurality of features and the feature when the data sample satisfies the first threshold;
determine whether the reconstruction error satisfies a second threshold;
ignore the data sample when the reconstruction error satisfies the second threshold; and
update, by using the data sample, weights associated with the plurality of features of the feature learning model when the reconstruction error satisfies neither the first threshold nor the second threshold.

8. The apparatus of claim 7, wherein the reconstruction error satisfies the first threshold when the reconstruction error is greater than the first threshold.

9. The apparatus of claim 8, wherein the reconstruction error satisfies the second threshold when the reconstruction error is less than the second threshold.

10. The apparatus of claim 9, wherein the reconstruction error satisfies neither the first threshold nor the second threshold when the reconstruction error is between the first threshold and the second threshold, the first threshold being greater than the second threshold.

11. The apparatus of claim 7, wherein the reconstruction error is calculated based on differences between a value of the data sample and reconstruction values corresponding to the plurality of features.

12. The apparatus of claim 7, wherein the feature learning model comprises a neural network and each feature of the feature learning model comprises a neuron.

13. A non-transitory computer-readable medium storing computer executable code, comprising instructions for:
receiving a data sample as an input to a feature learning model;
calculating a reconstruction error based on the data sample and a plurality of features of the feature learning model;
determining whether the reconstruction error satisfies a first threshold;
adding a feature into the feature learning model to represent the data sample and updating, by using the data sample, weights associated with the plurality of features and the feature when the data sample satisfies the first threshold;
determining whether the reconstruction error satisfies a second threshold;
ignoring the data sample when the reconstruction error satisfies the second threshold; and
updating, by using the data sample, weights associated with the plurality of features of the feature learning model when the reconstruction error satisfies neither the first threshold nor the second threshold.

* * * * *